United States Patent
Jung et al.

(10) Patent No.: US 8,098,685 B2
(45) Date of Patent: Jan. 17, 2012

(54) METHOD AND APPARATUS OF SCHEDULING BANDWIDTH IN CABLE NETWORK

(75) Inventors: Joon Young Jung, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 153 days.

(21) Appl. No.: 12/540,705

(22) Filed: Aug. 13, 2009

(65) Prior Publication Data

US 2010/0128739 A1  May 27, 2010

(30) Foreign Application Priority Data

Nov. 24, 2008  (KR) .................. 10-2008-0116889

(51) Int. Cl.
*H04J 3/22* (2006.01)
(52) U.S. Cl. .................. 370/468; 370/477
(58) Field of Classification Search .............. 370/462; 455/452; 725/126

See application file for complete search history.

(56) References Cited

U.S. PATENT DOCUMENTS

| 6,742,187 | B1 * | 5/2004 | Vogel | 725/126 |
| 2002/0052205 | A1 * | 5/2002 | Belostotsky et al. | 455/452 |
| 2007/0206600 | A1 | 9/2007 | Klimker et al. | |
| 2009/0213871 | A1 * | 8/2009 | Carlson et al. | 370/462 |

FOREIGN PATENT DOCUMENTS

| JP | 2002-094533 A | 3/2002 |
| KR | 1020060062918 A | 6/2006 |

* cited by examiner

*Primary Examiner* — Kwang B Yao
*Assistant Examiner* — Syed M Bokhari
(74) *Attorney, Agent, or Firm* — Ladas & Parry LLP (57) ABSTRACT

Disclosed are a method and apparatus of scheduling a bandwidth in a cable network. The method includes receiving variable information set according to a condition of a network, calculating a packet time slot value in which a delay time gain is maximized using the received variable information; setting an algorithm allocating a bandwidth between channels of the network using the packet time slot value, and operating a Cable Modem Termination System (CMTS) according to the algorithm.

22 Claims, 6 Drawing Sheets

METHOD AND APPARATUS OF SCHEDULING BANDWIDTH IN CABLE NETWORK

CROSS-REFERENCE TO RELATED APPLICATION

This application claims priority from Korean Patent Application No. 10-2008-0116889, filed on Nov. 24, 2008, in the Korean Intellectual Property Office, the entire disclosure of which is incorporated herein by reference.

BACKGROUND OF THE INVENTION

1. Field of the Invention

The present invention relates to a method and apparatus of scheduling a bandwidth in a cable network, and more particularly to bandwidth allocation of an upstream channel in a cable network based on a Data-Over-Cable Service Interface Specifications (DOCSIS) 3.0 standards.

2. Description of Related Art

Since a Data Over Cable Service Interface Specifications (DOCSIS), that is, a data transmission protocol in a DOCSIS 3.0 standards hybrid fiber coax (HFC) network may have a structure controlling each modem based on a time slot, in which a Time Division Multiplexing (TDM) scheme is used in a downstream and a Time Division Multiple Access (TDMA) scheme is used in an upstream, Quality of Service (QoS) may be applicable to multimedia data being sensitive to a Voice over Internet Protocol (VoIP) or delay in a DOCSIS layer.

Multicast in the DOCSIS 3.0 may newly add a DOCSIS specific control protocol between a Cable Modem Termination System (CMTS) and a Cable Modem (CM).

Also, in the DOCSIS standards, an Allocation MAP (MAP) scheduling algorithm implemented in the CMTS may be selectively implemented according to manufacturers without defining specific standards with respect to the MAP scheduling algorithm.

DOCSIS 2.0 may support a maximum downstream service of 42 Mbps and a maximum upstream service of 30 Mbps using a single upstream channel and a single downstream channel, however, DOCSIS 3.0 may concurrently use multiple channels bonded in a modem, thereby increasing a bandwidth.

Accordingly, there arises a need for channel bandwidth allocation which may reduce a bandwidth request collision in the DOCSIS 3.0 network using channel bonding, thereby reducing a network delay time.

SUMMARY OF THE INVENTION

According to an aspect of the present invention, there is provided a method of scheduling a bandwidth in a cable network, the method including: receiving variable information set according to a condition of a network; calculating a packet time slot value in which a delay time gain is maximized using the received variable information; setting an algorithm allocating a bandwidth between channels of the network using the packet time slot value; and operating a Cable Modem Termination System (CMTS) according to the algorithm.

In this instance, the method of scheduling the bandwidth may further include: periodically monitoring the network; determining whether a variable condition is generated in the network based on a result of the monitoring; and re-receiving the variable information being changed according to the variable condition when the variable condition is generated in the network.

According to an aspect of the present invention, there is provided an apparatus of scheduling a bandwidth in a cable network, the apparatus including: a receiving unit to receive variable information set according to a condition of a network; a calculating unit to calculate a packet time slot value in which a delay time gain is maximized using the received variable information; a setting unit to set an algorithm allocating a bandwidth between channels of the network using the packet time slot value; an operating unit to operate a CMTS according to the algorithm; a monitoring unit to periodically monitor the network; and a determining unit to determine whether a variable condition is generated in the network based on a monitored result. In this instance the receiving unit may re-receive the variable information being changed according to the variable condition when the variable condition is generated in the network.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

Figure 1:
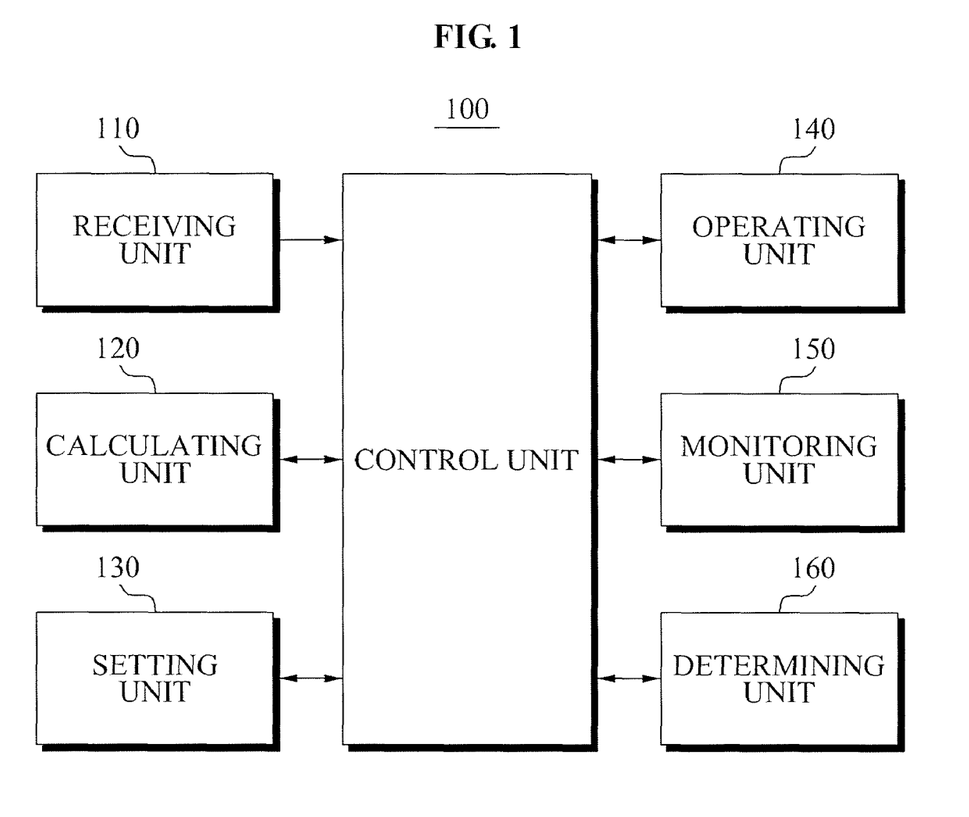
FIG. 1 is a block diagram illustrating a configuration of an apparatus of scheduling a bandwidth in a cable network according to example embodiments.

FIG. 1 is a block diagram illustrating a configuration of an apparatus 100 for scheduling a bandwidth in a cable network according to example embodiments.

The apparatus 100 according to an example embodiment includes a receiving unit 110, a calculating unit 120, a setting unit 130, an operating unit 140, a monitoring unit 150, and a determining unit 160.

The receiving unit 110 may receive variable information set according to a condition of a network.

The calculating unit 120 may calculate a packet time slot value in which a delay time gain is maximized using the received variable information.

In this instance, the variable information may include constant variable information set when operating a Cable Modem Termination System (CMTS) in an initialization condition of the network, and a target variable information set as a performance target value of the network.

Specifically, a user may set, as the constant variable information, a length $L_{map}$ of a Manufacturing Automation Protocol (MAP), a length $L_{mini-slot}$ of a predetermined mini-slot, a ratio $r_{cs}$ of a contention slot within the MAP, a number $N_{ch}$ of combined upstream channels, a Data Backoff Start (DBS), a Data Backoff End (DBE), a modulation rate, and a modulation format. Also, the user may set, as the target variable information, information about a number of CMs that are grouped and share a single combined channel, or information about a load of the network.

The setting unit 130 may set an algorithm allocating a bandwidth between channels of the network using the packet time slot value.

The operating unit 140 may operate the CMTS according to the algorithm.

Also, the apparatus 100 may periodically monitor the network using the monitoring unit 150, and may determine whether a variable condition is generated in the network based on a monitored result using the determining unit 160.

In this instance, a control unit of the present example embodiment may re-receive the variable information that is changed according to the variable condition when the variable condition is generated in the network, thereby enabling the above described process to be repeatedly performed.

A method of scheduling a bandwidth in a cable network according to an example embodiment will be described hereinafter in detail.

The method according to the present example embodiment may adapt a downstream channel bonding technique and an upstream channel bonding technique based on Data-Over-Cable Service Interface Specifications (DOCSIS) 3.0 standards, thereby enabling a bandwidth of the upstream and downstream channel to be increased.

Specifically, according to an example embodiment, there is disclosed the method of scheduling the bandwidth with respect to the channel bonding technique of DOCSIS 3.0 standards, in which a bandwidth may be increased in accordance with a processing capability of CMTS and CM.

A channel bonding process according to an example embodiment may be controlled by the CMTS as a part of a scheduling process for bandwidth allocation, and when the CM requests, for a bandwidth with respect to a given service flow, a single channel of upstream channels corresponding to the service flow, the CMTS may select whether to allocate a bandwidth to at least one channel of the upstream channels with respect to the service flow.

Also, the CMTS of the present example embodiment may be responsible for the bandwidth allocation through each of the upstream channels, and may perform a load balance in real time with respect to channels within any channel bonding group.

Also, when receiving the bandwidth allocation via multiple channels, the CM of the present example embodiment may divide transmission data in accordance with a bandwidth and a time, each being allocated to each channel, and transmit the divided transmission data. In this instance, the bandwidth allocated to each channel may be distributed at different points in time, or distributed at an identical point in time.

Also, the CMTS of the present example embodiment may determine how to divide a bandwidth being requested by the CM.

Figure 2:
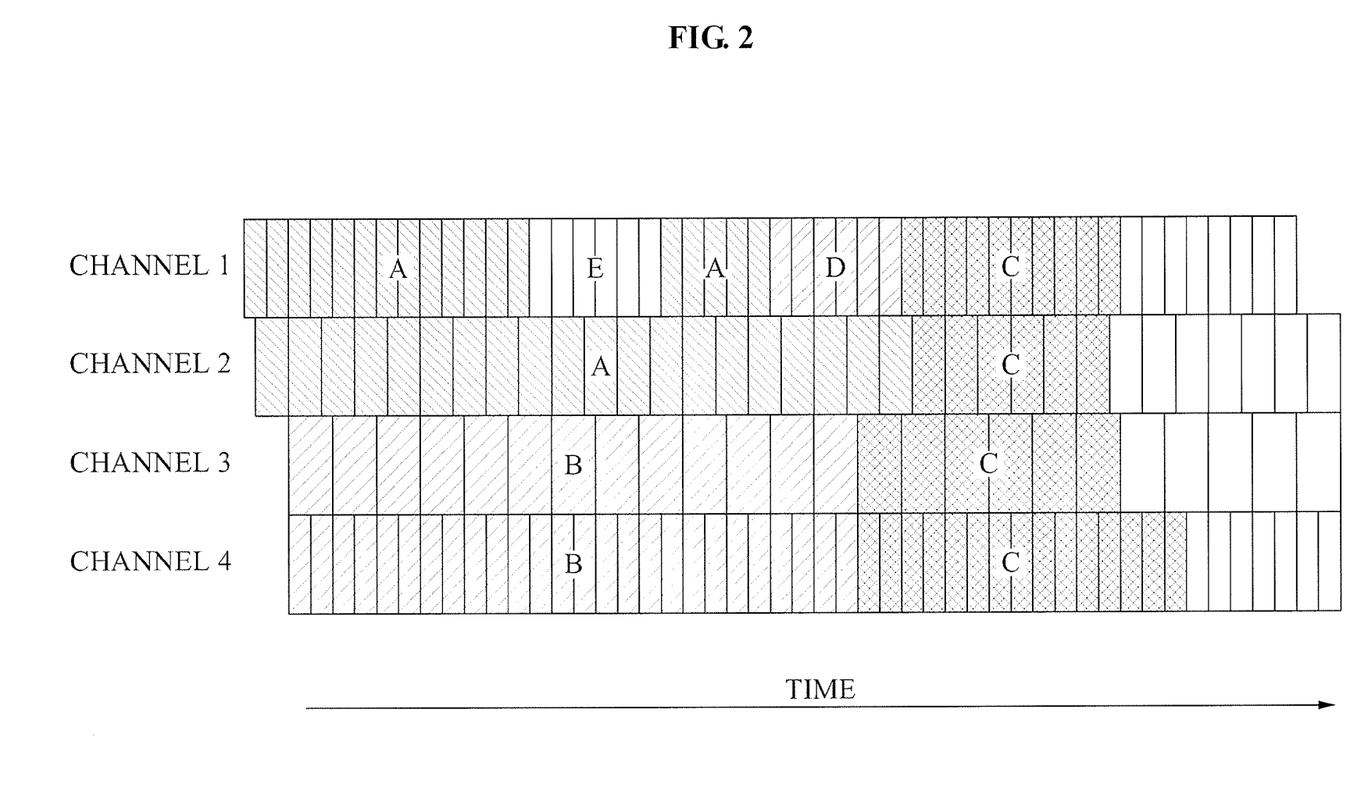
FIG. 2 illustrates an example of scheduling a bandwidth to four upstream channels having different mini-slot lengths according example embodiments.

FIG. 2 illustrates an example of scheduling a bandwidth to four upstream channels having different mini-slot lengths according example embodiments.

As an example, as illustrated in FIG. 2, blocks E and D may show that a bandwidth is allocated to another service flow supporting voice services, and the CMTS may allocate a bandwidth using channels 1 and 2 with respect to a bandwidth request of a block A, using channels 3 and 4 with respect to a bandwidth request of a block B, and using all channels with respect to a bandwidth request of a block C.

According to the present example embodiment, a complexity may be increased since a bandwidth scheduling is required to be performed using multiple channels in the DOCSIS 3.0 standards, and thus there may be disclosed the method of scheduling the bandwidth in which a bandwidth request collision is reduced in the DOCSIS 3.0 network using channel bonding, thereby reducing a network delay time.

Figure 3:
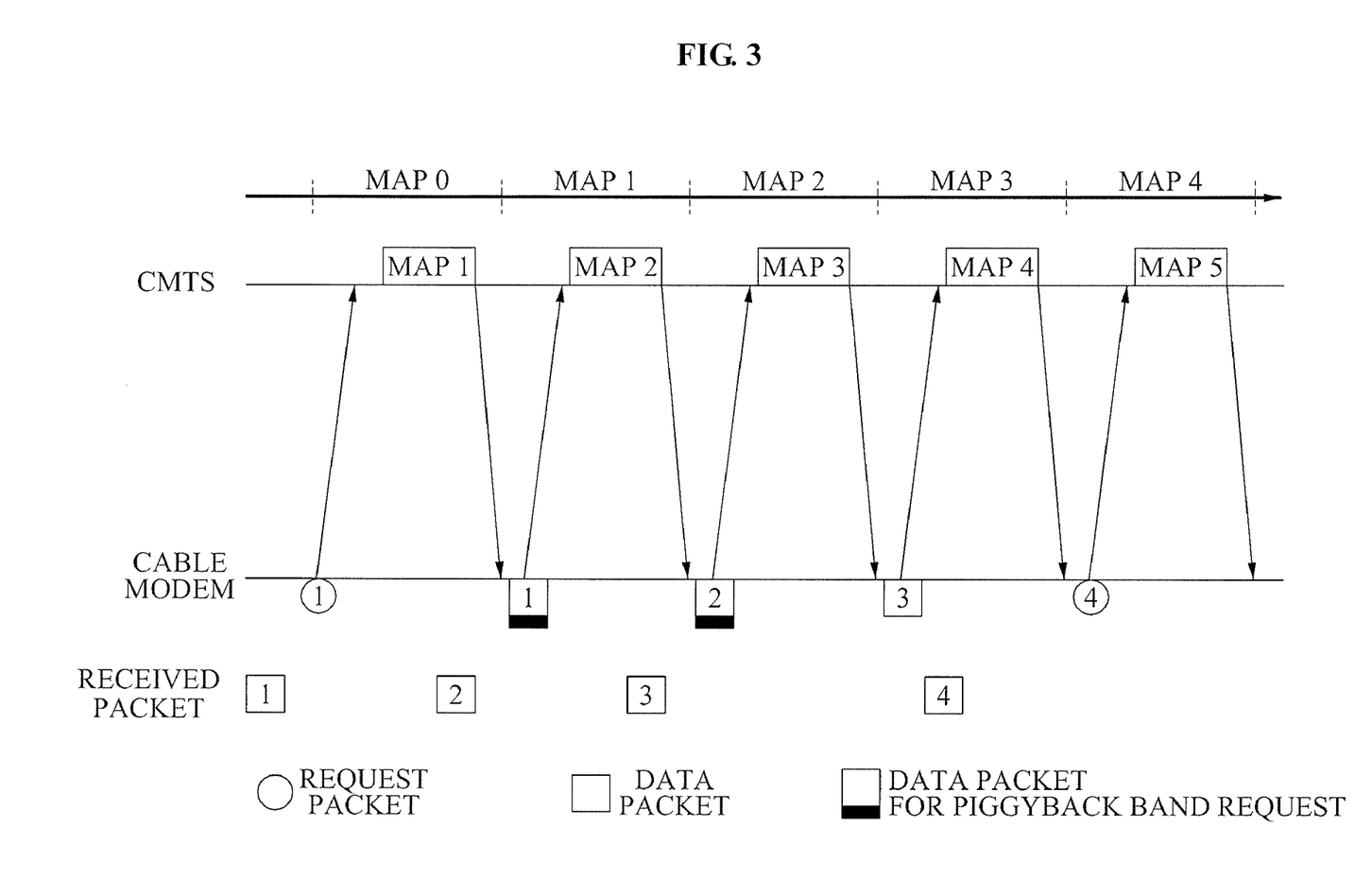
FIG. 3 illustrates an example of a mechanism of a piggyback in a Data Over Cable Service Interface Specifications (DOCSIS) scheme according to example embodiments.

FIG. 3 illustrates an example of a mechanism of a piggyback in a DOCSIS scheme according to example embodiments.

As illustrated in FIG. 3, a method of scheduling a bandwidth using a piggyback mechanism is provided.

As an example, the piggyback mechanism provided in the present example embodiment, the CM requests the CMTS for a bandwidth with respect to an MAP 0 section when a data packet 1 is inputted to the CM. In this instance, the CMTS may allocate a bandwidth to an MAP 1 section with respect to the bandwidth request of the CM.

Next, according to the present example embodiment, when a data packet 2 is inputted to the CM before a data packet 1 is transmitted to an allocated bandwidth with respect to the data packet 1, a piggyback band request is possible at the same time as transmission of the packet 1. Thus, since the piggyback band request is performed in the MAP 1 section, a bandwidth may be allocated to the data packet 2 in an MAP 2 section. Similarly, since a data packet 3 is inputted before the data packet 2 is transmitted, the piggyback band request is possible. However, since a data packet 4 is not inputted before the data packet 3 is transmitted, the piggyback band request is impossible, and thus a bandwidth request process may be required to be re-performed.

Figure 4:
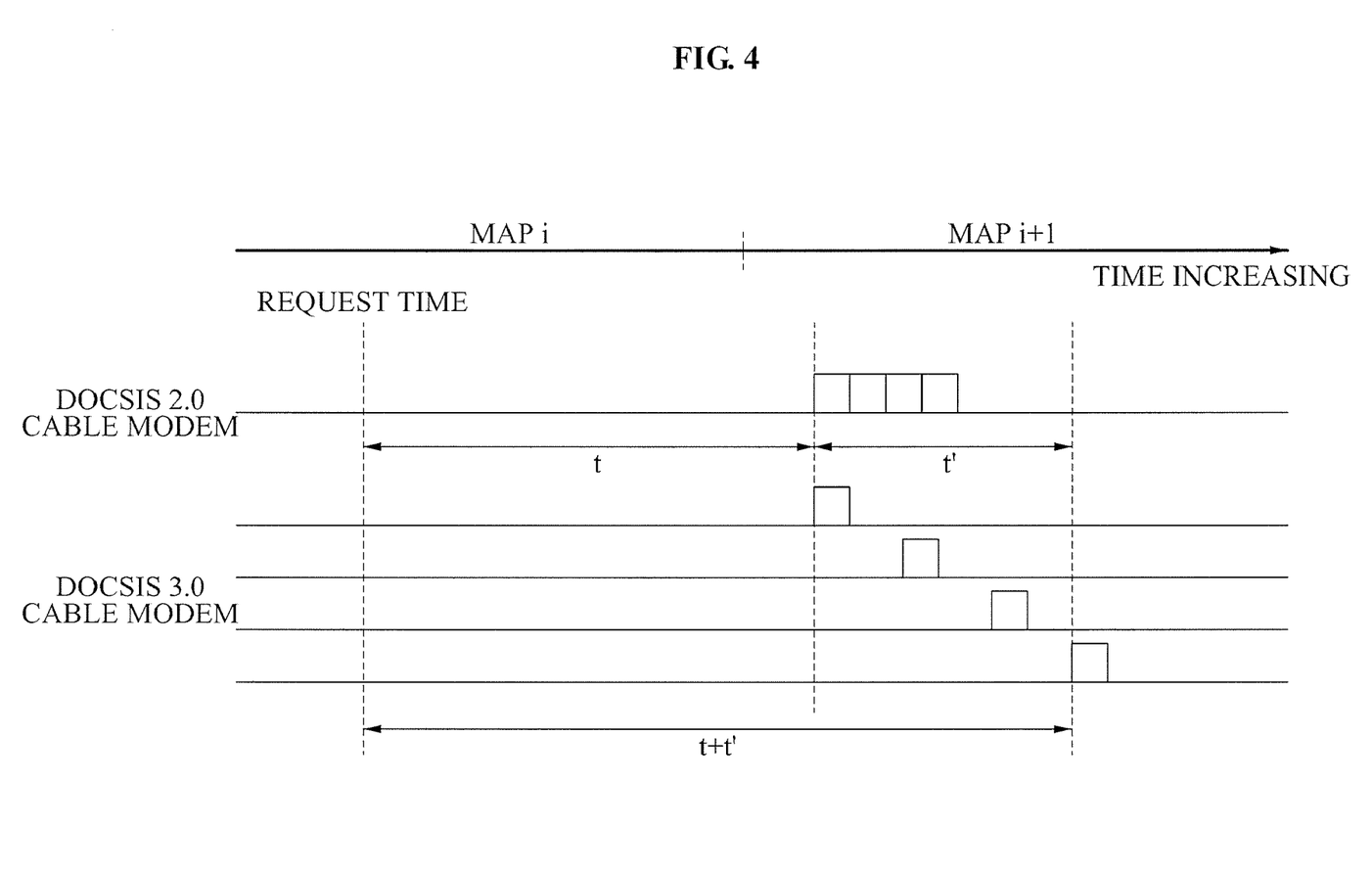
FIG. 4 illustrates an example of allocating a bandwidth according to example embodiments.

FIG. 4 illustrates an example of allocating a bandwidth according to example embodiments.

In DOCSIS 2.0, as illustrated in FIG. 4, when a time slot ranged from requesting a bandwidth in an MAP i section to transmitting a packet in an MAP i+1 section is t, the piggyback band request may be possible when the packet is inputted to the CM within the time slot t.

However, in DOCSIS 3.0 according to the present example embodiment, a bandwidth having the same amount as that in the DOCSIS 2.0 may be allocated, and, as illustrated in FIG. 4, since the bandwidth may be divided and allocated with respect to four channels in a time slot, a time enabling the piggyback band request may be increased to be t+t'. Specifically, according to the present example embodiment, a packet arrival probability may be increased by the increased t', whereby a possibility of the piggyback band request may be increased.

Thus, according to the present example embodiment, a bandwidth allocation scheduling method maximizing effects of the piggyback band request will be described in detail as below.

According to an example embodiment, a Pareto distribution having a shape parameter $\alpha$ and a location parameter $\beta$ as a packet inter-arrival time may be assumed.

A probability density function and a probability distribution function of a basic Pareto distribution may be defined as Equations 1 and 2 below, respectively.

$$f(t) = \begin{cases} 0, & t \leq \beta \\ \frac{\alpha}{\beta}\left(\frac{\beta}{t}\right)^{\alpha+1}, & t > \beta. \end{cases} \quad \text{[Equation 1]}$$

$$F(t) = \begin{cases} 0, & t \leq \beta \\ 1 - \left(\frac{\beta}{t}\right)^{\alpha}, & t > \beta. \end{cases} \quad \text{[Equation 2]}$$

Also, an average value for the packet inter-arrival time t may be shown as Equation 3 below.

$$E(T) = \frac{\alpha\beta}{\alpha - 1} = \frac{1}{\lambda}, \alpha > 1. \quad \text{[Equation 3]}$$

In this instance, $\lambda$ represents a packet arrival rate. For example, a probability distribution may have an infinite distribution value when $\alpha \geq 2$ and may have an infinite average value and an infinite distribution value when $\alpha \leq 1$.

Also, a distribution of a length of a data packet transmitted from each CM to an upstream channel may be shown in Table 1, and an average length $L_D$ of the data packet may be 368.1 bytes.

TABLE 1 distribution of packet size

| | Packet size (byte) | | | | |
|---|---|---|---|---|---|
| | 64 | 128 | 256 | 512 | 1024 | 1518 |
| Probability | 0.6 | 0.06 | 0.04 | 0.02 | 0.25 | 0.03 |

Accordingly, the packet arrival rate $\lambda$ with respect to each CM may be shown as Equation 4 below.

$$\lambda = \frac{B \times \rho}{k \times L_D}. \quad \text{[Equation 4]}$$

In this instance, B represents a bandwidth of an upstream channel, k represents a number of CMs presently existing on a network, and $\rho$ represents a load placed on the network. The placed load may be defined as a ratio of a channel capacity to a placed traffic source.

In this instance, a burstiness of the traffic source may be adjusted by $\alpha$, for example, 1.3 may be assumed. Accordingly, the location parameter $\beta$ may be inferred as $(\alpha 1)/\alpha\lambda$ from Equation 4.

Consequently, the above described traffic may be generated in an upper layer of each CM with respect to $\rho$, and the generated traffic may be transmitted to an MAC hierarchy transmission queue, that is, a physical address used in an Ethernet network model of a local area network (LAN) in an information communication network within a specific region.

Also, when a new packet arrives at the CM, a CM to which a bandwidth is granted from the CMTS for processing a previously received packet may perform a piggyback on the bandwidth request with respect to the arriving new packet, otherwise, a bandwidth request is required to reach the CMTS through a contention process.

In this instance, when it is assumed that the traffic source having the packet arrival rate $\lambda$ of Equation 3 is inputted in k-numbered CMs, a probability $p_{req}$ in which a bandwidth request is performed by a CM in a single contention slot may be obtained as shown in Equation 5 below.

$$p_{req} = \frac{\lambda \cdot L_{map}}{N_{ch} \cdot n_{to}}. \quad \text{[Equation 5]}$$

In this instance, $L_{map}$ represents a length of an MAP, $N_{ch}$ represents a number of combined upstream channels, $n_{to}$ and represents a number of Transmission Opportunities (TOs) of a bandwidth request included in a single MAP section per channel. When a bandwidth request message is transmitted in a single mini-slot, $n_{to}$ may be identical to $n_{req}$ of a number of contention slots included in the single MAP. In the present example embodiment, it is assumed that $n_{to} = n_{req}$.

In this instance, a probability $p_s$ in which a bandwidth request succeeds in a single contention slot is identical to a probability in which only a single CM of $k-$ numbered CMs requests a bandwidth, which is represented as Equation 6 below.

$$p_s = k \cdot p_{req} \cdot (1 - p_{req})^{k-1}. \quad \text{[Equation 6]}$$

Also, a probability in which a collision is generated in the single contention slot is identical to a value obtained by subtracting a probability in which the CM does not request the bandwidth from a probability in which the bandwidth request succeeds in any case, which is represented as Equation 7 below.

$$p_c = 1 - p_s - (1 - p_{req})^k. \quad \text{[Equation 7]}$$

When the CM requests the bandwidth request using the probability in which the collision is generated in the single contention slot, a probability $p_i$ in which the bandwidth request succeeds in an $i$-th bandwidth request attempt may be represented as Equation 8 below.

$$p_i = (1 - p_c) p_c^{i-1}. \quad \text{[Equation 8]}$$

Accordingly, a frequency $E[N_{req}]$ with respect to an average bandwidth request for receiving bandwidth allocation by the CM may be represented as Equation 9 below.

$$E[N_{req}] = \sum_{i=1}^{\infty} i \cdot p_i = \sum_{j=1}^{\infty} j(1 - p_c) p_c^{j-1} = \frac{1}{1 - p_c}. \quad \text{[Equation 9]}$$

In the DOCSIS scheme according to an example embodiment, a Truncated Binary Exponential Back-off (TBEB) algorithm may be used to solve the collision in the contention slot, and the TBEB algorithm may be performed by a CM to which a Data-Backoff-Stait (DBS) and a Data-Backoff-End (DBE) within the MAP message are transmitted.

As an example, when the CM requests the bandwidth, a Back-off Window may be set as 0 to $2^{DBS}-1$ using the DBS, and a Back-off value may be randomly set within the Window.

As another example, when DBS is 4, the Back-off Window having values of 0 to 15 may be set, and when a randomly selected value is 11, the CM may delay the TO eleven times, and then transmit a bandwidth request message.

However, when a collision is generated in a previously transmitted bandwidth request message, the CM may increase the Back-of Window value by multiplying by two to be 0 to $2^{DBS+1}$, and the Back-off Window value may be randomly selected within the Window.

Specifically, when the collision is consecutively generated, the CM may increase the Back-off Window by multiplying by two, however, when the increasing Back-off Window reaches $2^{DBE}-1$, the Window may no longer increase. As a result, a maximum transmission frequency of the CM may be limited to 16.

Also, an average Back-off value in accordance with the bandwidth request frequency may be obtained as below in order to examine an average delay time due to the Back-off.

For example, a Back-off expectation value in the Back-off Window having values of 0 to 15 may be 7.5, and in a case where the bandwidth request is repeatedly performed due to the generated collision, when the Back-off Window value increases from 0 to 31, the Back-off expectation value may be 15.5.

Accordingly, the Back-off expectation value with respect to the bandwidth requests at twice may be 7.5+15.5, that is, 23. Accordingly, when a total Back-off value with respect to a bandwidth request frequency of n is B(n), E[B(n)] of the average Back-off value (delay TO or slot) may be represented as Equation 10 below, in a case where a and b represent a DBS and a DBE, respectively.

$$E[B(n)] = \begin{cases} \sum_{i=0}^{n-1} \frac{2^{a+i}-1}{2}, & n \le b-a+1 \\ \sum_{i=0}^{b-a} \frac{2^{a+i}-1}{2} + (n-b+a-1)\frac{(2^b-1)}{2}, & n > b-a+1. \end{cases}$$ [Equation 10]

Accordingly, when a ratio $r_{cs}$ of the contention slot within the MAP is considered, an average delay due to the Back-off may be a slot of $E[B(n)]/r_{cs}$. Specifically, when a bandwidth is allocated after the bandwidth request of n-times, E[D(n)] of an average access delay of the packet based on the Back-off may be represented as Equation 11 below.

$$E[D(n)] = \frac{E[B(n)]}{r_{cs}} \cdot L_{mini-slot} + n \cdot T_{req} + T_{data}.$$ [Equation 11]

In this instance, $T_{req}$ is a required time for the bandwidth request, which is represented as $T_{req}$=round trip delay+ CMTS schedule time, and $T_{data}$ is an average required time for data packet transmission, which is represented as $T_{data}$=round trip delay+$L_D$/C by applying an average length $L_D$ of the data packet therein. In this instance, C represents a capacity of an upstream channel.

In Equation 11, $E[N_{req}]$ of an average bandwidth request frequency of Equation 9, that is, $T_{delay}$ of an average access delay time in accordance with a collision probability obtained by using $1/(1-p_c)$ may be represented as Equation 12 below.

$$T_{delay} = E\left[D\left(\frac{1}{1-p_c}\right)\right]$$ [Equation 12]

$$= \frac{E\left[B\left(\frac{1}{1-p_c}\right)\right]}{r_{cs}} \cdot L_{mini-slot} + \frac{1}{1-p_c} \cdot T_{req} + T_{data}.$$

In this instance, as described above, $T_{req}$ represents the required time for the piggyback band request, $T_{data}$ represents the average required time for packet transmission, $r_{cs}$ represents a ratio of the contention slot within the MAP, $L_{min\ i-slot}$ represents a length of the predetermined mini-slot, PC represents a probability in which a collision is generated in any one of the contention slots, B represents a bandwidth of the upstream channel, E represents an average bandwidth request frequency for receiving the bandwidth allocation by the predetermined CM, $$B\left(\frac{1}{1-p_c}\right)$$

represents a total Back-off value with respect to $$\frac{1}{1-p_c},$$

and $$E\left[D\left(\frac{1}{1-p_c}\right)\right]$$

represents an average access delay value of a packet based on the Back-off.

A process of obtaining the average access delay time without considering the piggyback band request has been described above. However, when considering the piggyback band request, the number k of CMs requesting the bandwidth in Equation 6 may be represented as Equation 13 below.

$$k(T)=k \cdot (1-F(T)).$$ [Equation 13]

In this instance, F(T) may be PDF of Equation 3, and T may be a time slot enabling the piggyback band request. Specifically, the piggyback band request may be possible only when the packet is inputted to the CM within T.

Accordingly, Equation 6 may be represented as Equation 14 below, by using k(T) of Equation 13 instead of using k.

$$p_s(T)=k(T) \cdot p_{req} \cdot (1-p_{req})^{k(T)-1}.$$ [Equation 14]

Also, Equation 7 may be represented as Equation 15 below, based on Equations 13 and 14.

$$p_c(T)=1-p_s(T)-(1-p_{req})^{k(T)}.$$ [Equation 15]

Consequently, when considering the piggyback band request, $T_{delay}$ of the average access delay time in accordance with the collision probability of Equation 13 may be represented as Equation 16 below.

$$T_{delay}(T) = \quad \text{[Equation 16]}$$

$$E\left[D\left(\frac{1}{1-p_c(T)}\right)\right] = \frac{E\left[B\left(\frac{1}{1-p_c(T)}\right)\right]}{r_{cs}} \cdot L_{mini-slot} + \frac{1}{1-p_c(T)} \cdot T_{req} + T_{data}(T)$$

In addition, the method of scheduling the bandwidth in the cable network according to an example embodiment will be described in comparison with a First Come First Served (FCFS) method widely used in the DOCSIS scheme.

Figure 5:
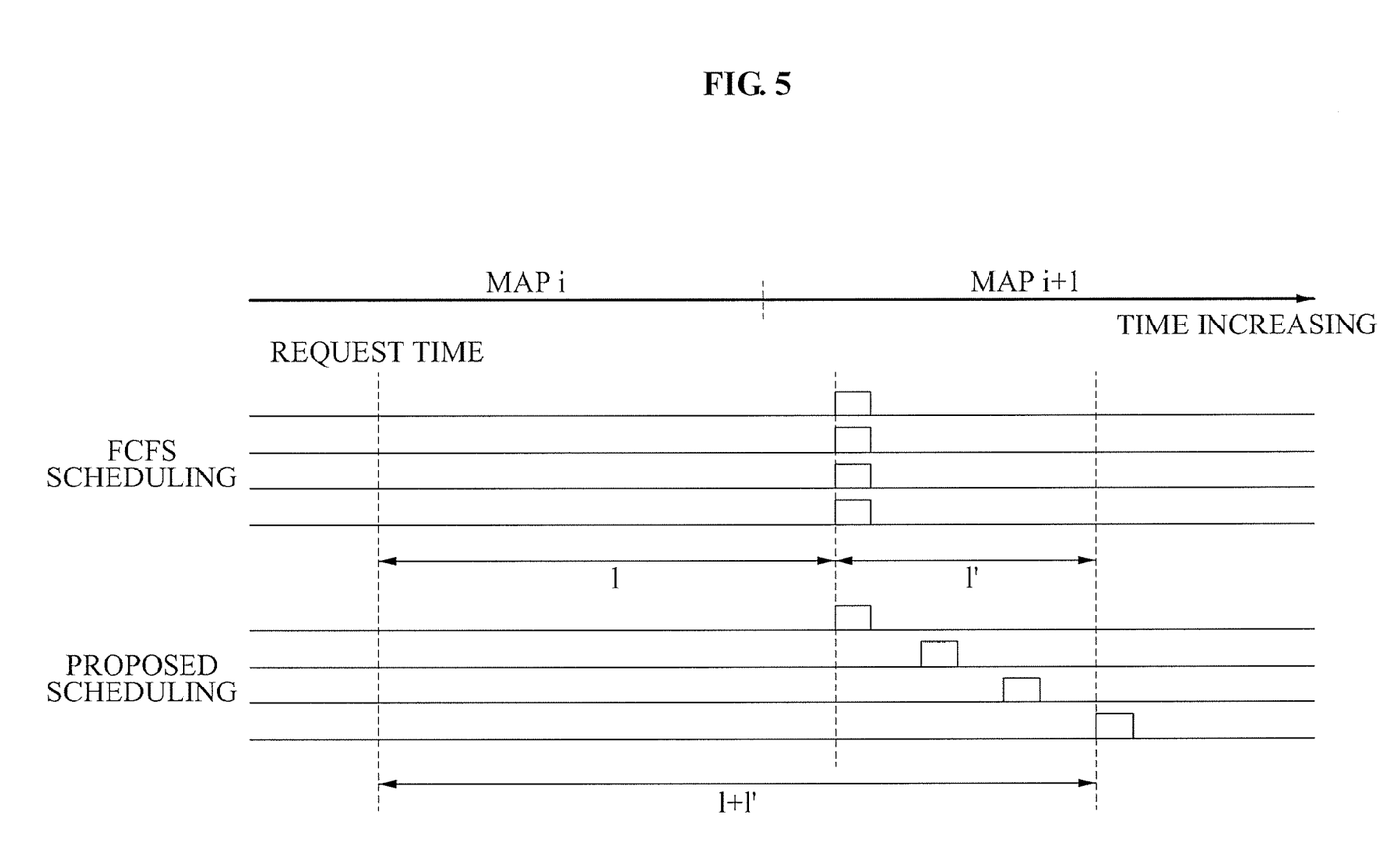
FIG. 5 illustrates a comparison of a method of scheduling a bandwidth in a cable network according to example embodiments and a First Come First Served (FCFS) method.

FIG. 5 illustrates a comparison of a method of scheduling a bandwidth in a cable network according to example embodiments and an FCFS method.

In this instance, in both methods, bandwidth allocation with respect to the upstream channels may be assumed to be uniform in allocation.

l of FIG. 4 represents a time for enabling the piggyback band request. In this instance, since the piggyback band request may be performed when a packet is inputted to the CM before requesting a bandwidth in an preceding MAP section, and then transmitting data in a following MAP section, a value of l may be relatively similar to an MAP transmission frequency. That is, $l \approx L_{map}$ may be satisfied.

Consequently, in the method of scheduling the bandwidth according to an example embodiment, whether segment packets are required to be distributed using a determined amount of the packet time slot l' in order to maximize effects of the piggyback band request.

Consequently, Equation 16 may be represented as a function with respect to the time slot T enabling the piggyback band request. Also, according to an example embodiment, $T_{data}(T)$ of Equation 16 may be changed into $T_{data}$=round trip delay+$L_D/(N_{ch} \cdot C)$+l'.

Accordingly, $T_{data}(T)$ may satisfy $T_{data}(T) \approx$ round trip delay+$L_D/(N_{ch} \cdot C)$+$(T-L_{map})$.

Consequently, according to an example embodiment, l' of the segment packet time slot maximizing the delay time gain may be obtained by Equation 17 below.

$$g(l')=[T_{delay}(l)-T_{delay}(l+l')]_{max}, l \approx L_{map} \text{ and } 0 \le l' \le L_{map}. \quad \text{[Equation 17]}$$

In this instance, l' represents the packet time slot value, l represents a time for enabling a piggyback band request, $T_{delay}(l)$ represents an average access delay time in accordance with a collision probability with respect to l, $T_{delay}(l+l')$ represents an average access delay time in accordance with a sum of l and l', g(l') represents a maximum value of the delay time gain, and $L_{map}$ represents a length of MAP.

Consequently, the method of scheduling the bandwidth in the cable network according to an example embodiment may calculate l' of the packet time slot maximizing g(l') of the delay time gain, set a bandwidth allocation algorithm between channels using the calculated l', and then operate the CMTS in accordance with the bandwidth allocation algorithm.

Thus, according to an example embodiment, the packet time slot maximizing the delay time gain may be calculated, and the CMTS may be operated using the bandwidth allocation algorithm in accordance with the packet time slot value, thereby increasing a piggyback band request probability to reduce the access delay time, resulting in increasing a throughput of the network, and increasing efficiency of the network.

The method of scheduling the bandwidth in the cable network according to an example embodiment will be described in detail with reference to FIG. 6.

In this instance, the method of scheduling the bandwidth in the cable network according to the present example embodiment may use the apparatus 100 for scheduling the bandwidth.

Figure 6:
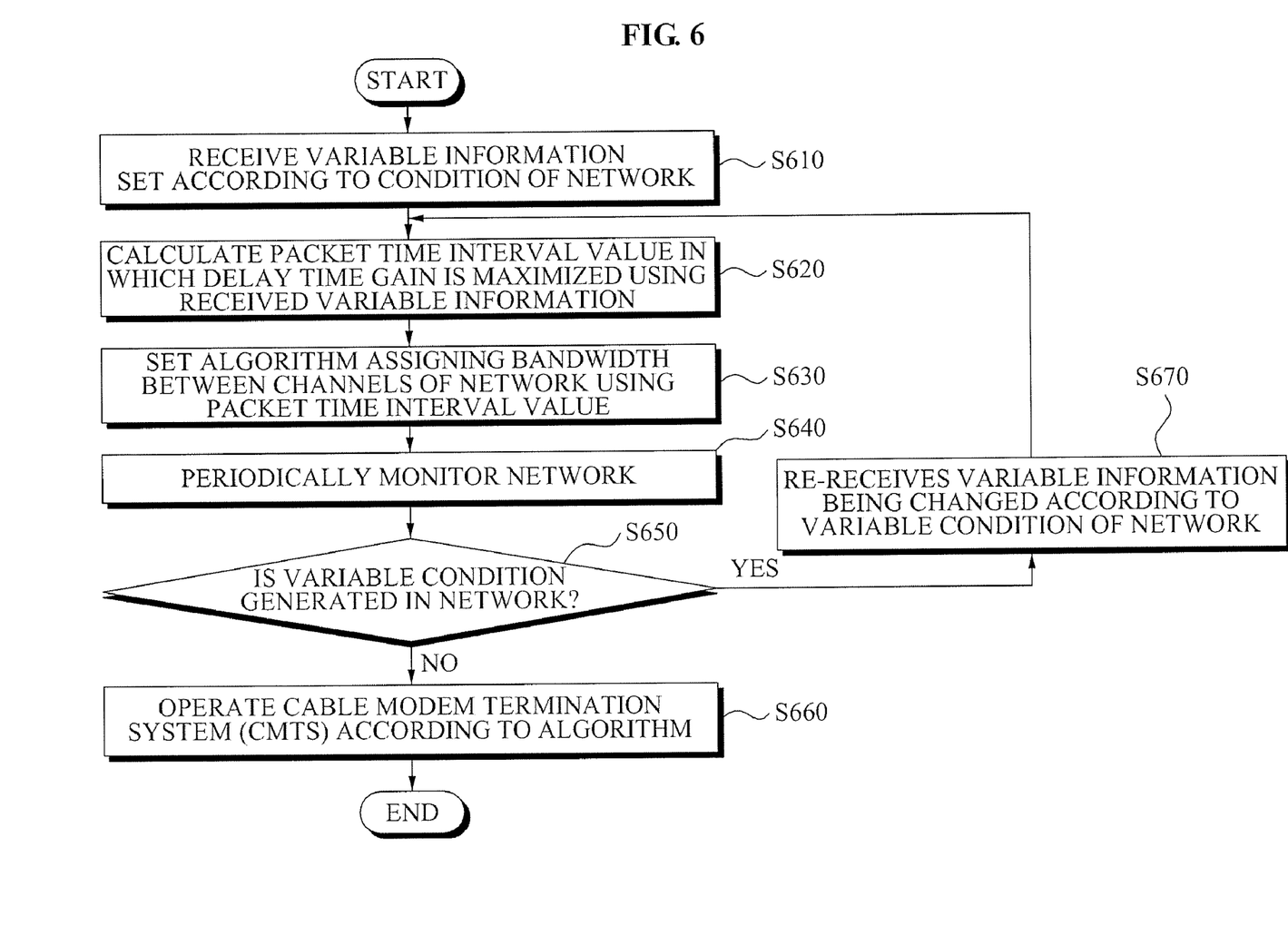
FIG. 6 is a flowchart illustrating a method of scheduling a bandwidth in a cable network according to example embodiments.

FIG. 6 is a flowchart illustrating a method of scheduling a bandwidth in a cable network according to example embodiments.

As illustrated in FIG. 6, in operation S610, a receiving unit 110 may receive variable information set depending on a condition of a network.

In operation S620, the calculating unit 120 may calculate a packet time slot value in which a delay time gain is maximized using the received variable information.

In this instance, the variable information may include constant variable information set when operating the CMTS in an initialization condition of the network, and includes target variable information set as a performance target value of the network.

In operation S630, the setting unit 130 may set bandwidth allocation algorithm between channels of the network using the packet time slot value.

Finally, in operation S660, the operating unit 140 may operate the CMTS according to the algorithm.

Also, in operation S640, the monitoring unit 150 may periodically monitor the network, and in operation S650, the determining unit 160 may determine whether a variable condition is generated in the network based on a monitored result.

In this instance, in operation S670, the control unit may re-receive the variable information being changed according to the variable condition when the variable condition is generated in the network to thereby enable the above described operations to be repeatedly performed.

As described above, according to the present disclosure, segment frames may be disposed at a predetermined time slot when allocating a bandwidth, thereby increasing an opportunity of the piggyback band request.

According to the present disclosure, a collision probability may be reduced in a contention slot, thereby reducing an overall frame delay.

According to the present disclosure, a superior algorithm may be provided with respect to the access delay time in the DOCSIS cable network.

According to the present disclosure, a throughput of the network may be increased, thereby increasing efficiency of the network.

The method of scheduling the bandwidth according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of scheduling a bandwidth in a cable network, the method comprising:
   receiving variable information set according to a condition of a network;
   calculating a packet time slot value in which a delay time gain is maximized using the received variable information;
   setting an algorithm allocating a bandwidth between channels of the network using the packet time slot value; and
   operating a Cable Modem Termination System (CMTS) according to the algorithm,
   wherein the packet time slot value has a value obtained by subtracting an average access delay time in accordance with a sum of a time for enabling a piggyback band request and the packet time slot value from an average access delay time in accordance with a collision probability with respect to the time for enabling the piggyback band request, when the time for enabling the piggyback band request corresponds to a length of a manufacturing automation protocol (MAP), and the packet time slot value corresponds to zero or the length of the MAP.

2. The method of claim 1, further comprising:
   periodically monitoring the network;
   determining whether a variable condition is generated in the network based on a result of the monitoring; and
   re-receiving the variable information being changed according to the variable condition when the variable condition is generated in the network.

3. The method of claim 1, wherein the variable information includes constant variable information set when operating the CMTS in an initialization condition of the network, and includes target variable information set as a performance target value of the network.

4. The method of claim 3, wherein the constant variable information includes at least one of the length $L_{map}$ of the MAP, a length $L_{mini\text{-}slot}$ of a predetermined mini-slot, a ratio $r_{cs}$ of a contention slot within the MAP, a number $N_{ch}$ of combined upstream channels, a Data Backoff Start (DBS), a Data Backoff End (DBE), a modulation rate, and a modulation format.

5. The method of claim 3, wherein the target variable information includes at least one of information about a number of Cable Modems (CMs) sharing a single combined channel, the CMs being grouped, and information about a load of the network.

6. The method of claim 1, wherein the calculating of the packet time slot value is performed by Equation 18 below, which is represented as $$g(l') = [T_{delay}(l) - T_{delay}(l+l')]_{max}, \ l \approx L_{map} \text{ and } 0 \leq l' \leq L_{map},$$ [Equation 18]

wherein l' represents the packet time slot value, l represents the time for enabling a piggyback band request, $T_{delay}(l)$ represents the average access delay time in accordance with a collision probability with respect to l, $T_{delay}(l+l')$ represents the average access delay time in accordance with a sum of l and l', g(l') represents the maximum value of the delay time gain, and $L_{map}$ represents the length of MAP.

7. The method of claim 6, wherein, when the piggyback band request is not considered, $T_{delay}$ of the average access delay time in accordance with the collision probability of Equation 18 is calculated by Equation 19 below, which is represented as $$T_{delay} = E\left[D\left(\frac{1}{1-p_c}\right)\right] = \frac{E\left[B\left(\frac{1}{1-p_c}\right)\right]}{r_{cs}} \cdot L_{mini\text{-}slot} + \frac{1}{1-p_c} \cdot T_{req} + T_{data},$$ [Equation 19]

wherein $T_{req}$ represents a required time for the piggyback band request, $T_{data}$ represents an average required time for packet transmission, $r_{cs}$ represents a ratio of a contention slot within the MAP, $L_{mini\text{-}slot}$ represents a length of a predetermined mini-slot, $p_c$ represents a probability in which a collision is generated in any one of the contention slots, B represents a bandwidth of an upstream channel, E represents an average bandwidth request frequency for receiving bandwidth allocation by a predetermined Cable Modem (CM), $$B\left(\frac{1}{1-p_c}\right)$$

represents a total Back-off value with respect to $$\frac{1}{1-p_c},$$

and $$E\left[D\left(\frac{1}{1-p_c}\right)\right]$$

represents an average access delay value of a packet based on the Back-off.

8. The method of claim 1, wherein, when the piggyback band request is considered, $T_{delay}(T)$ of the average access delay time in accordance with the collision probability of Equation 18 is calculated by Equation 20 below, which is represented as $$T_{delay}(T) = E\left[D\left(\frac{1}{1-p_c(T)}\right)\right] = \frac{E\left[B\left(\frac{1}{1-p_c(T)}\right)\right]}{r_{cs}} \cdot L_{mini\text{-}slot} + \frac{1}{1-p_c(T)} \cdot T_{req} + T_{data}(T),$$ [Equation 20]

wherein T represents a time slot for enabling the piggyback band request, $T_{req}$ represents a required time for the piggyback band request, $T_{data}(T)$ represents an average required time for packet transmission with respect to T, $r_{cs}$ represents a ratio of a contention slot within an MAP, $L_{mini-slot}$ represents a length of a predetermined mini-slot, $p_c(T)$ represents a probability in which a collision is generated in any one of the contention slots with respect to T, B represents a bandwidth of an upstream channel, E represents an average bandwidth request frequency for receiving bandwidth allocation by the predetermined CM, $$B\left(\frac{1}{1-p_c(T)}\right)$$

represents a total Back-off value with respect to $$\frac{1}{1-p_c(T)}$$

in accordance with T, and $$E\left[D\left(\frac{1}{1-p_c(T)}\right)\right]$$

represents an average access delay value of a packet based on the Back-off.

9. The method of claim 7, wherein $p_c$ of the probability in which the collision is generated in any one of the contention slots is calculated by Equation 21 below, which is represented as $$p_c=1-p_s-(1-p_{req})^k,\quad\text{[Equation 21]}$$

wherein $p_s$ represents a probability in which the piggyback band request succeeds in any one of the contention slots, $p_{req}$ represents a probability in which the CM requests the piggyback band, and k represents a number of the CMs.

10. The method of claim 8, wherein $p_c(T)$ of the probability in which the collision is generated in any one of the contention slots is calculated by Equation 22 below, which is represented as $$p_c(T)=1-p_s(T)-(1-p_{req})^{k(T)},\quad\text{[Equation 22]}$$

wherein $p_s(T)$ represents a probability in which the piggyback band request succeeds in any one of the contention slots of T, $p_{req}$ represents a probability in which the CM requests the piggyback band, and k(T) represents a number of the CMs.

11. The method of claim 9, wherein $p_s$ of the probability in which the piggyback band request succeeds in any one of the contention slots is calculated by Equation 23 below, which is represented as $$p_s=k\cdot p_{req}\cdot(1-p_{req})^{k-1}.\quad\text{[Equation 23]}$$

12. The method of claim 10, wherein $p_s(T)$ of the probability in which the piggyback band request succeeds in any one of the contention slots of T is calculated by Equation 24 below, which is represented as $$p_c(T)=1-p_s(T)-(1-p_{req})^{k(T)}.\quad\text{[Equation 24]}$$

13. A non-transitory computer readable recording medium having coded instructions implementing the method of claim 1.

14. An apparatus of scheduling a bandwidth in a cable network, the apparatus comprising:

a receiving unit to receive variable information set according to a condition of a network;

a calculating unit to calculate a packet time slot value in which a delay time gain is maximized using the received variable information;

a setting unit to set an algorithm allocating a bandwidth between channels of the network using the packet time slot value;

an operating unit to operate a Cable Modem Termination System (CMTS) according to the algorithm;

a monitoring unit to periodically monitor the network; and a determining unit to determine whether a variable condition is generated in the network based on a monitored result, wherein the receiving unit re-receives the variable information being changed according to the variable condition when the variable condition is generated in the network, wherein the packet time slot value has a value obtained by subtracting an average access delay time in accordance with a sum of a time for enabling a piggyback band request and the packet time slot value from an average access delay time in accordance with a collision probability with respect to the time for enabling the piggyback band request, when the time for enabling the piggyback band request corresponds to a length of a manufacturing automation protocol (MAP), and the packet time slot value corresponds to zero or the length of the MAP.

15. The apparatus of claim 14, wherein the variable information includes constant variable information set when operating the CMTS in an initialization condition of the network, and target variable information set as a performance target value of the network.

16. The apparatus of claim 15, wherein constant variable information includes at least one of a length $L_{map}$ of MAP, a length $L_{mini-slot}$ of a predetermined mini-slot, a ratio $r_{cs}$ of a contention slot within the MAP, a number $N_{ch}$ of combined upstream channels, a Data Backoff Start (DBS), a Data Backoff End (DBE), a modulation rate, and a modulation format.

17. The apparatus of claim 16, wherein the target variable information includes at least one of information about a number of Cable Modems (CMs) sharing a single combined channel, the CMs being grouped, and information about a load of the network.

18. The method of claim 16, wherein the calculating of the packet time slot value is performed by Equation 25 below, which is represented as $$g(l')=[T_{delay}(l)-T_{delay}(l+l')]_{max},\ l\approx L_{map}\ \text{and}\ 0\leq l'\leq L_{map},\quad\text{[Equation 25]}$$

wherein l' represents the packet time slot value, l represents the time for enabling a piggyback band request, $T_{delay}(l)$ represents the average access delay time in accordance with a collision probability with respect to l, $T_{delay}(l+l')$ represents the average access delay time in accordance with a sum of l and l', g(l') represents the maximum value of the delay time gain, and $L_{map}$ represents the length of MAP.

19. The non-transitory computer readable recording medium of claim 13 is selected from the group consisting of a hard disk, a floppy disk, a magnetic tape, an optical CD ROM, a ROM, a RAM, and a flash memory.

20. An apparatus of scheduling a bandwidth in a cable network, the apparatus comprising: a calculating unit to calculate a packet time slot value in which a delay time gain is maximized using a received variable information in which the packet time slot is calculated by using Equation 25 below, which is represented as $$g(l')=[T_{delay}(l)-T_{delay}(l+l')]_{max},\ l\approx L_{map},\text{ and }0\leq l'\leq L_{map},\quad\text{[Equation 25]}$$

wherein l' represents the packet time slot value, l represents a time for enabling a piggyback band request, $T_{delay}(l)$ represents an average access delay time in accordance with a collision probability with respect to l, $T_{delay}(l+l')$ represents an average access delay time in accordance with a sum of l and l', g(l') represents a maximum value of the delay time gain, and $L_{map}$ represents a length of a Manufacturing Automation Protocol (MAP).

21. The apparatus of claim 20, further comprising a receiving unit to receive the variable information set according to a condition of a network.

22. The apparatus of claim 20, further comprising:
a setting unit to set an algorithm allocating a bandwidth between channels of the network using the packet time slot value;
an operating unit to operate a Cable Modem Termination System (CMTS) according to the algorithm;
a monitoring unit to periodically monitor the network; and
a determining unit to determine whether a variable condition is generated in the network based on a monitored result,
wherein the receiving unit re-receives the variable information being changed according to the variable condition when the variable condition is generated in the network.

* * * * *